United States Patent [19]
Louvenberg et al.

[11] Patent Number: 5,001,688
[45] Date of Patent: Mar. 19, 1991

[54] APPARATUS FOR PLAYING RECORD CARRIERS USING PLAYING FREQUENCY RANKING

[75] Inventors: Wilhelmus M. H. Louvenberg; Henricus F. M. Van Kempen, both of Eindhoven, Netherlands

[73] Assignee: U.S. Philips Corporation, New York, N.Y.

[21] Appl. No.: 288,059

[22] Filed: Dec. 20, 1988

[30] Foreign Application Priority Data

Feb. 23, 1988 [NL] Netherlands ............... 8800451

[51] Int. Cl.$^5$ .............................................. G11B 7/00
[52] U.S. Cl. ........................................ 369/32; 369/47; 369/57; 360/72.1
[58] Field of Search ............... 369/57, 32, 34, 36–38, 369/33, 47; 360/72.1, 72.2

[56] References Cited

U.S. PATENT DOCUMENTS

| | | | |
|---|---|---|---|
| 4,538,253 | 8/1985 | Ishibashi et al. | 369/34 |
| 4,539,663 | 9/1985 | Ishibashi et al. | 369/34 |
| 4,779,252 | 10/1988 | Custers et al. | 369/32 |

FOREIGN PATENT DOCUMENTS 0169597 1/1986 European Pat. Off. .
2430047 1/1980 France .

*Primary Examiner*—Robert L. Richardson
*Attorney, Agent, or Firm*—John F. Moran

[57] ABSTRACT

Apparatus for playing record carriers includes a memory (6) and means (1, 3) for storing in the memory (6) record-carrier identifications together with preferred selections which indicate specific parts of the record-carrier associated with the record-carrier identification. Prior to playing of a record-carrier loaded into the apparatus, the record-carrier identification of this record-carrier is determined and it is detected whether the memory (6) already contains a preferred selection for the detected record-carrier identification. When this is the case, the record-carrier to be played can be played in comformity with one of the associated preferred selections stored in the memory (6). The apparatus comprises means (3) for updating data indicative of the playing frequency of the record-carrier associated with the stored record-carrier identification. If upon entry of new disc identifications and preferred selections the available storage capacity is inadequate, the disc identification and preferred selection associated with the record-carrier played least frequently is removed from the memory (6) depending on the playing-frequency data.

6 Claims, 3 Drawing Sheets

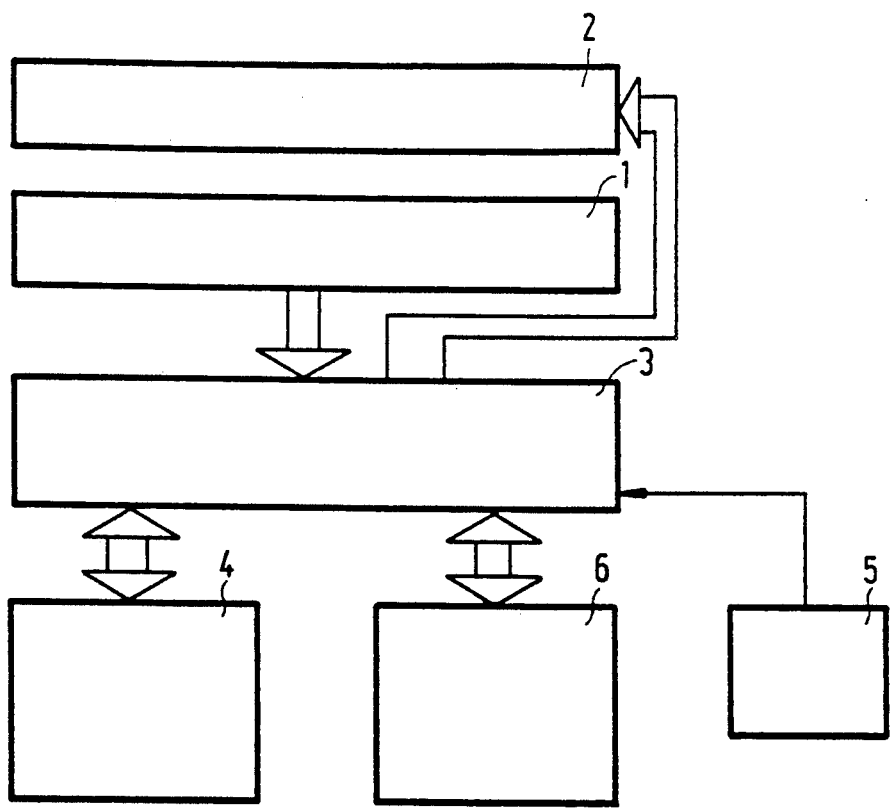

APPARATUS FOR PLAYING RECORD CARRIERS USING PLAYING FREQUENCY RANKING

BACKGROUND OF THE INVENTION

The invention relates to apparatus for playing record carriers having a memory and loading the memory with record-carrier identifications together with preferred selections denoting specific parts of the record carriers corresponding to the record-carrier identifications, detecting, prior to playing of the record-carrier, the record-carrier identification of the record-carrier to be played, selecting a preferred selection associated with the detected record-carrier identification if the detected record-carrier identification is stored in the memory, and then controlling the apparatus to play that the part of the record-carrier as defined by the chosen preferred selection.

Such type of apparatus is known from Netherlands patent application No. 8402095 which corresponds to U.S. Pat. No. 4,779,252, and is incorporated by reference. The apparatus described therein is a player for Compact Discs wherein a user can enter a preferred selection for a plurality of discs. This preferred selection together with the disc identification of the associated disc is stored in the memory. If a disc for which a preferred program is stored is subsequently loaded into the apparatus in order to be played, the parts of the disc corresponding to the stored preferred program are played, providing that the user has instructed to do so by actuation of an appropriate key on the apparatus.

Since such an apparatus enables a specific desired part of the disc to be played at an arbitrary instant without necessitating another time-consuming search operation, the apparatus is very suitable for use in broadcasting studios or discothéques. Generally, music program produced by broadcasting studios and discothéques comprises a sequence of tracks from different discs and, usually, only one of the tracks recorded on each of said discs is reproduced. The apparatus described in the forgoing enables the preferred selections forming the program of tracks to be reproduced to be stored in advance in the memory of the apparatus by the disc jockey. During the reproduction of the music program, the disc jockey then merely has to load the discs containing the desired tracks into the apparatus for playing, after which the part of the disc containing the desired track and indicated by the preferred selection can be searched and played automatically. In this way, it is avoided that during production of the program the disc jockey consumes too much time in searching for the parts of the disc on which the desired tracks are recorded.

A drawback of such conventional apparatus of this type is that on account of the limited storage capacity of the memory the number of preferred selections which can be stored is also limited, so that only preferred selections can be stored for a limited number of tracks. This means that once the memory is full a number of preferred selections have to be removed from the memory in order to enter preferred selections for new discs. A problem associated with the known apparatus is then that making a well-founded choice as to the preferred selections to be removed is an almost impossible task.

SUMMARY OF THE INVENTION

It is an object of the invention to provide apparatus of the previously described type which enables a well-founded choice to be mode of in deleting the preferred selections. According to the invention, this object is acheived by apparatus for updating data indicative of the frequency with which the record carriers corresponding to the stored record-carrier identifications have been played.

Thus, by using the playing frequencies it is possible to determine for which record-carrier identification the corresponding preferred selections have been used the least. By first removing the record-carrier identifications and preferred selections corresponding to the record carriers which have been played least frequently, the preferred selections of a limited group of most frequently played record carriers always remain stored in the memory. Since almost every music program comprises a large number of the music tracks specified by these permanently stored preferred selections, the disc jockey need only enter a preferred selection for a limited number of all the music tracks forming the music program in order to prepare a new music program, which minimizes the preparation time.

An illustrative embodiment of the apparatus, in which the least frequently used preferred selections are cancelled automatically, includes means for removing the record-carrier indentification and the corresponding preferred selection of one of the least frequently played record carriers depending on the of one of the least frequently played record carriers depending on the playing-frequency data if the available storage capacity is inadequate to store a new record-carrier identification and the associated preferred selection.

An illustrative embodiment of the apparatus which is very attractive because of its simplicity is characterized in that the means for updating the playing frequencies are adapted to assign positions in a ranking order to the record-carrier identifications, the ranking position being indicative of the playing frequency of the associated record-carrier, the means for updating the playing frequencies including means for ranking up a record-carrier identification by interchanging the positions of the record-carrier indentifications when the associated record-carrier is played, and including means for inserting a new record-carrier identification at a predetermined ranking position when a new record-carrier identification is to be stored in the memory.

BRIEF DESCRIPTION OF THE DRAWINGS

The invention and further advantages thereof will now be described in more detail, by way of example, with reference to FIGS. 1 to 4, in which FIG. 1 shows diagrammatically an embodiment of the apparatus in accordance with the invention, FIGS. 2, 3 and 3a are diagrams to explain the operation of the apparatus in accordance with the invention in terms of identifying selections and memory organization.

DETAILED DESCRIPTION OF THE PREFERRED EMBODIMENT

Figure 3:
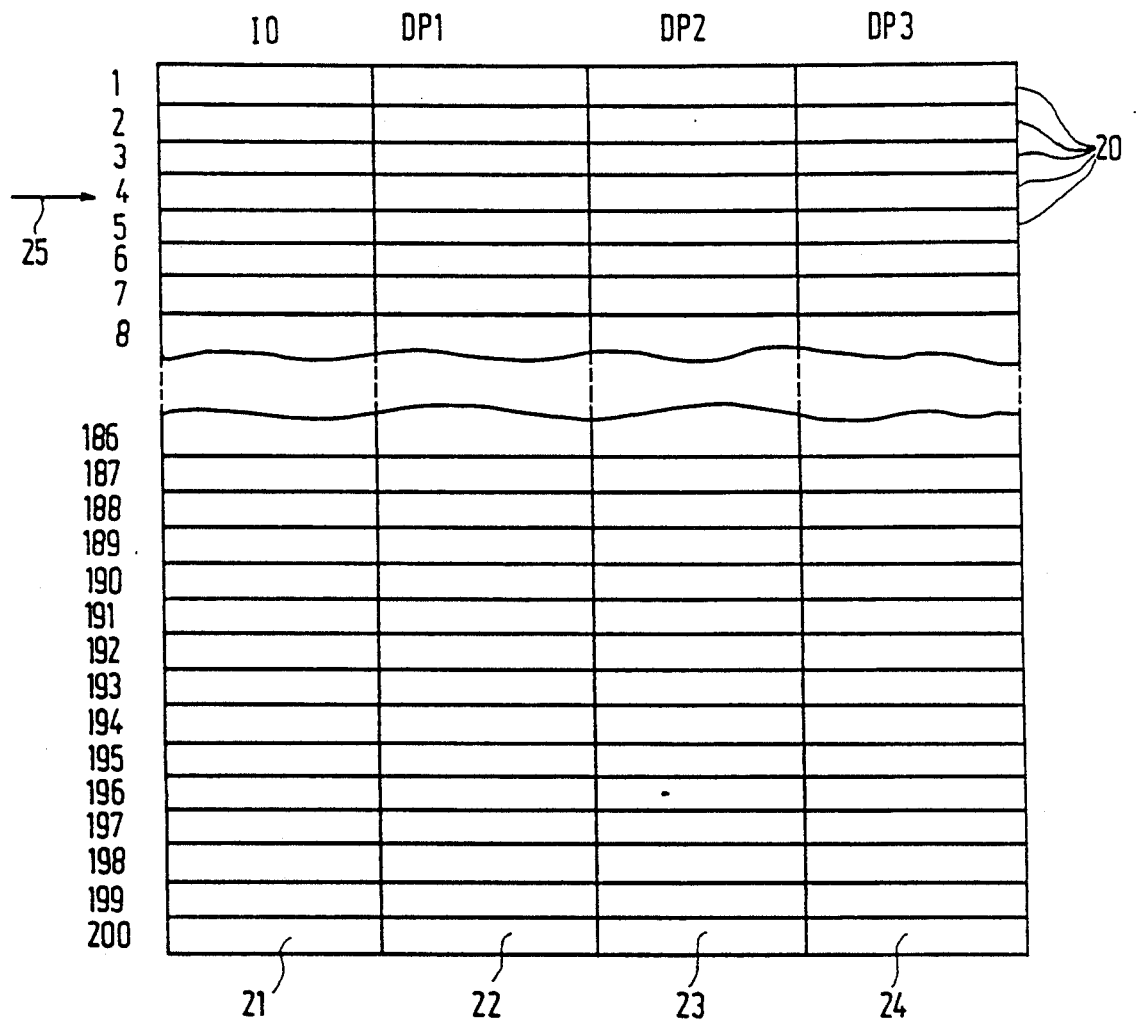

FIG. 1 shows the block diagram of a Compact Disc player relevant to the present invention. The description is based on known commercially available Compact Disc players, such as for example the players available from N. V. Philips' Gloeilampenfabrieken under the type numbers 304 and LHH 2000. These known players comprise a control pannel 1 for the entry of inter alia the preferred selection. Such a control pannel may be, for example, a conventional keyboard. The player includes a display 2 for displaying messages or the entered preferred selections. Such a display may be, for example, an alphanumeric display or a display screen. Apart from the possibility of programming a track number selection it is also possible to make a selection by index (parts of tracks), time within a track number, or absolute time. A microcomputer 3 scans the control panel 1 and drives the display 2. Further, the microcomputer 3 can transfer the preferred selection to a control device 4, which in costumary manner controls the player in such a way that the selected items on the disc to be played are reproduced. For this purpose the microcomputer 3 receives a subcode from a subcode decoder circuit 5, which subcode is contained in the music data on the disc and is a running code representing inter alia track numbers, index and time, so that the microcomputer receives information about the part of the disc being reproduced. This information is transferred to the control device 4.

The player has the possibility of storing preferred selections of a plurality of discs in a memory 6, identifying discs to be played, and if desired, playing the part of the disc specified by the preferred selection. For this purpose, the microcomputer 3 is programmed to derive a disc identification from the subcode supplied by the decoder circuit 5. The disc identification may be, for example, a catalog number contained in the subcode, or an indication of a composer, performer, title etc., but at least at the date of filing of the present Application this data is not contained in the subcodes of all discs. Therefore, it is more advantageous to derive a disc identification from data present on every disc. One possibility is to select specific bit groups from the index table present on every disc and shown diagrammatically in FIG. 2. This index table comprises serial data in the form of groups of 4 bytes (4×8 bits) represented in hexadecimal notation in FIG. 2. The first byte of every group represents the track number, the second, the third, and the fourth byte represent the time at which the track starts after the beginning of the disc, expressed in minutes (2nd byte), seconds (3rd byte), and frames (4th byte), one frame being equal to 1/75 second. The index of all track numbers is followed by three 4-byte code blocks whose first bytes are A0, A1 and A2 respectively. The second byte of the block with the initial byte A0 represents the number of the first music track on the disc to be played, which number need not necessarily be "one", because a continuous sequence of numbers may be asigned to a plurality of discs. The third and the fourth byte of this group are both 00. Similarly, the group with the initial byte A1 represents the number of the last track in the second byte, and the third and the fourth byte are 00. The group with the initial byte A2 represents the time from the beginning of the lead-out track in minutes, seconds and frames in the second, the third and the fourth byte respectively.

The number of minutes and seconds of the first track number are not arbitrary. The number of frames (4th byte) is generally more or less arbitrary and is selected as the first byte of the disc identification. Both the number of seconds and the number of frames of the second track may be regarded as more or less arbitrary and therefore these two bytes have been selected as the second and the third byte of the disc identification, the bytes being for example 00 if the disc contains only one track. The second hexadecimal half of the second byte of the group with the initial byte A1 together with the second hexadecimal half of the second byte of the last group may be selected to form together the fourth byte of the disc identification. The fifth and the sixth byte of the disc identification are constituted by the last two bytes of the last group, which indicate the number of seconds and frames from the beginning of the lead-out track. In FIG. 2 the selected bytes have been encircled and together with the selected numerical examples they consitute the hexadecimal code 32-15-12-72-48-41. This code is also shown in FIG. 2, where it bears the reference ID. In practice the resulting disc identification may be regarded as a unique identification. In this respect it is to be noted that in principle a disc identification may be derived from the information to be reproduced instead of from a subcode which is not necessarily present.

The disc identification described with reference to FIG. 2 is derived from the subcode supplied by the decoder circuit 5 by suitably programming the microcomputer 3. Together with the preferred selection this code is stored in the memory 6. This information should be preserved in the memory 6 also after the player has been switched off, for example, by the use of battery-powered RAM memories or other non-volatile memories.

The part of the disc indicated by the preferred selection can be specified in various ways. Examples of this are:
track number addressing. This requires one byte per choice.
index-addressing within specific tracks. This requires 2 bytes per choice, namely one for the track number and one for the index.
time within the selected track, which requires 5 bytes, namely one for the track number, two for the starting time (mins., secs.) and two for the ending time,
absolute time selection, which requires four bytes, namely two for the starting time and two for the ending time.

The storage capacity of the preferred-selection memory 6 is generally limited, so that in the case that the residual storage capacity is inadequate to store the disc identification and the associated preferred selections for a new disc it is necessary to delete one of the disc identifications already stored in the memory 6. A suitable and well-founded criterion for determining the disc identification to be deleted are the playing frequencies of the discs associated with the disc identification code. In order to utilize this criterion the microcomputer 3 is loaded with a program for updating the data indicative of the playing frequencies of the discs corresponding to the disc identifications stored. Each time that a disc corresponding to a stored preferred selection is played this program is called to update the playing-frequency data. The data may comprise, for example, a date-time code added to the disc identification and indicating the date and the time at which the preferred selection associated with the disc has been used the last time. Updating the playing-frequency data is then achieved by adapting the date-time code of a disc once it is played.

To determine which disc identification stored in the memory is to be deleted the disc identification with the date-time code representing the least recent date and time may be used.

Another possibility of updating the playing-frequency data is to determine how many times each of the discs corresponding to the stored disc identification has been played within a predetermined time interval.

Yet another possibility of updating the playing frequency data, which is very suitable to be implemented by means of the microcomputer 3, will now be described in detail. In this case a position in a ranking is assigned to each disc identification, the ranking position of the disc identification being indicative of the playing frequency. If now a disc with a disc identification included in the ranking is played in conformity with the stored preferred selection, the disc identification moves to a higher ranking. This is possible for example by listing the relevant disc identification at the top of the ranking and by ranking down other stored disc identifications. However, this would mean a large number of changes in the ranking, which demands much computing time from the microcomputer 3. Another possibility requiring less computing time is to interchange the position of the relevant disc identification and the position of a disc identification having a higher, for example the next higher, ranking.

During playing of the discs, as a result of the repeated adaptation of the ranking, the disc identifications of frequently played discs will rank high, whereas the disc identifications of discs which are not played or hardly ever will constantly drop in ranking, so that the disc identifications at the bottom of the ranking always correspond to the discs played least frequently.

If a disc indentification for a new disc is to be stored the disc identification is entered at a predetermined position in the ranking, existing disc identifications of equal or lower ranking in comparison with the predetermined position being ranked down by one position.

If the storage capacity intended for the storage of the disc identification is fully utilized the disc identification having the lowest ranking position is removed. Such a ranking can be updated very simply if the disc identification is stored in a table, suitably a cycling table, in the memory 6, the position in the table being indicative of the ranking position. FIG. 3 shows such a table. The table comprises a fixed number of rows 20, for example two hundred, corresponding to the maximum number of disc identifications that can be stored. Each row comprises a number of bytes, for example twenty-four, arranged in four groups, namely a first six-byte group 21 for storing the disc identifications and a second group 22, a third group 23 and a fourth group 24, also comprising six bytes each, for the storage of three preferred selections associated with the disc identification. It is to be noted that in the present example the number of preferred selections that can be stored per disc identification has been selected fully arbitrarily. This number may also be smaller or greater than three.

Figure 3A:
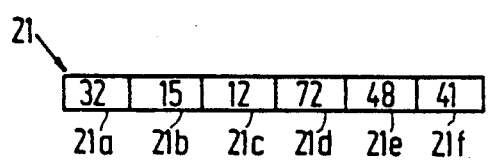

FIG. 3a shows the sixbytes 21a, . . . 21f of the first group of bytes 21 for storing a disc identification determined by means of the rules described with reference to FIG. 2.

Of the six bytes of the groups 22, 23 or 24 intended for the storage of the preferred selections one byte may be used to indicate the type of addressing employed for the preferred selection. The other five bytes can be used for storing the address. In that case each of the addressing types mentioned in the forgoing may be used for the preferred selection.

The table is stored in the memory 6 in customary manner. The beginning of the ranking stored in the table is indicated by an address pointer. In FIG. 3 this address pointer is represented diagrammatically as an arrow 25.

In the shown position of the address pointer 25 the fourth row of the table contains the disc identification having the highest ranking. The fifth row then contains the disc identification having the highest ranking but one etc. The row situated just above the row indicated by the address pointer 25 (in the present case the third row) then contains the disc identification having the lowest ranking. In such a cyclic table, in which the beginning of the ranking is indicated by the address pointer 25, a new disc identification can simply be entered at the top of the ranking by storing the new disc identification in the row situated just above the row indicated by the address pointer 25, after which the address pointer 25 is adapted by a value corresponding to one row. It will be obvious that it is equally possible to first adapt the address pointer and subsequently to enter the new disc identification in the row indicated by the new position of the address pointer 25. In this way the ranking can be supplemented with a new disc identification from the top, the address pointer then successively indicating the rows "4", "3", "2", "1", "200", "199", "198" etc. If the table is filled completely the disc identification having the lowest ranking will be overwritten and thus be erased from the memory when a new disc identification is entered at the top of the ranking.

Apart from the fact that when the disc identification is stored in order of playing frequency of the associated record carriers it is always simple to take a decision about the disc identifications to be cancelled, such a storage method has the advantage that the average time needed for searching whether a disc identification is stored in the table is short. Indeed, the most popular disc identifications are ranked at the top, so that they can be found very rapidly in the ranking if searching starts at the top of said ranking.

This short average search time is of particular importance if disc identifications for a very large number of record carriers are stored.

Figure 4:
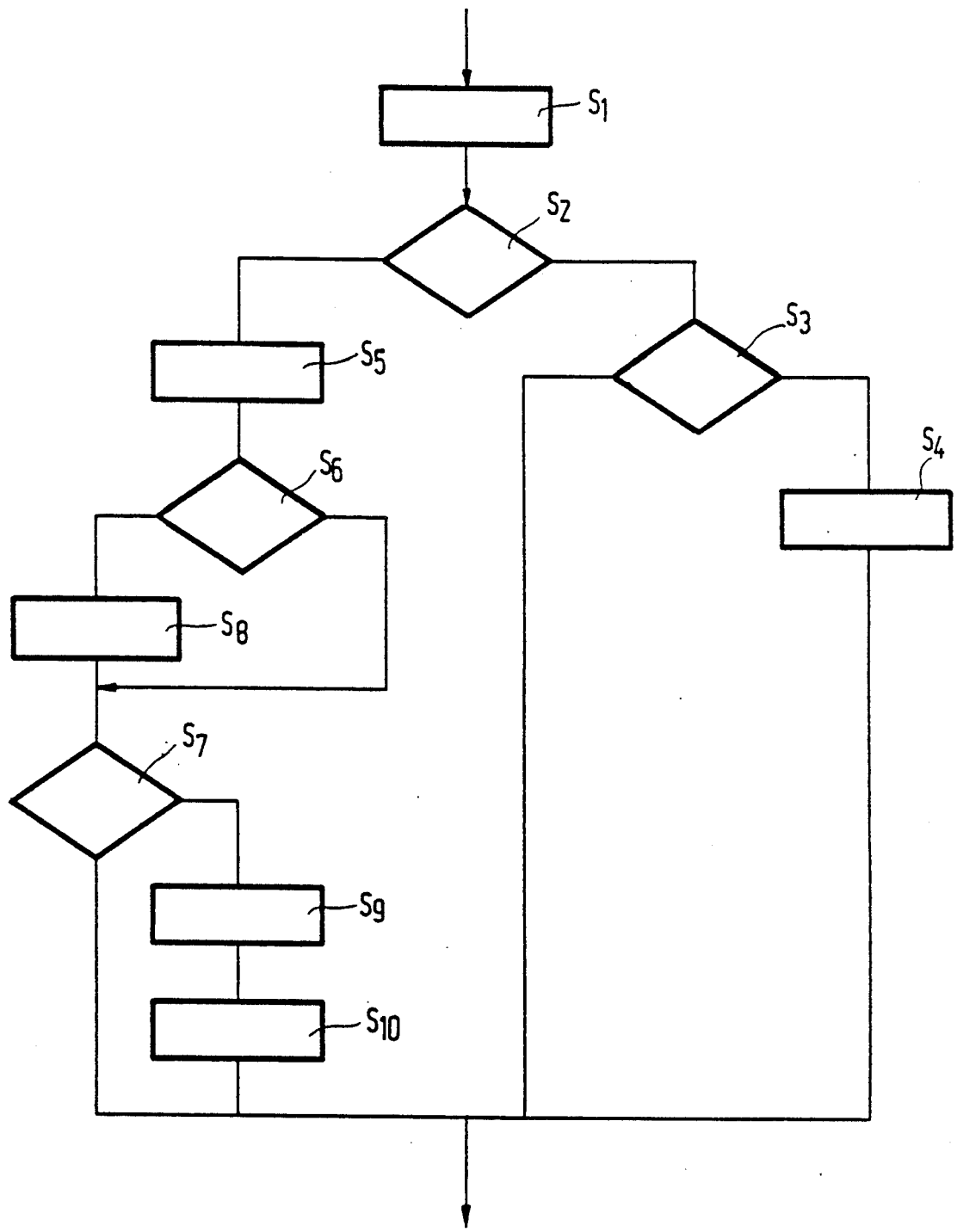
FIG. 4 is a flow chart to explain the programming of the microcomputer 3 in the apparatus.

FIG. 4 provides a flow chart of a program for the microcomputer 3 for adapting the ranking, which is stored in the memory 6 in the form of a cyclic table. The program is started by loading a disc into the player. Subsequently, in step S1 the disc identification is derived from the index table stored on the disc according to the rules described with reference to FIG. 2. The disc identification thus detected is stored in the working storage of the microcomputer 3. Subsequently, in step S2 it is ascertained whether the detected disc identification is already stored in the table in the memory 6. If this is not the case, it is determined in step S3 by data entered by the operator via the control panel 1 whether one or more preferred selections is to be stored for the disc to be played. If this is not required the program is terminated. However, if storage of preferred selections is required step S4 is carried out. During step S4 the user can enter a number (in the present example maximum three) of preferred selections via the control panel 1 in the customary manner. These preferred selections are temporarily stored in the working storage of the computer 3. After entry of the preferred selection the address pointer 25 is adapted in such a way that it points towards the next row in the table and subsequently the entered preferred selections together with the disc identification detected in step S1 are stored in the row of the table in the memory 6 indicated by the address pointer 25. After this the program is ceases.

If during step S2 is found that the disc identification detected in step S1 is already stored in the table, the program proceeds with step S5 instead of step S3. In step S5 the preferred selections corresponding to the detected disc identification are fetched from the table and stored in the working storage of the microcomputer 3. These preferred selections are then indicated on the display 2. In step S6, is determined by means of the information entered by the user via the control panel 1 whether an adaptation of the preferred selection is required. If not, step S6 is followed by step S7. If an adaptation is required, the preferred selections can be adapted during step S8 of the program and subsequently these adapted preferred selections are stored in the working storage and in the table. The user can indicate via the control panel 1 whether the disc is to be played and, if this is the case, which of the stored preferred selections of the disc must be played. This choice is determined in step S7 and if playing is not desired the program is abandoned. If the user has selected one of the preferred selections step S7 is followed by step S9. In step S9 the chosen preferred selection is entered into the control device 4, after which playing is started in conformity with the preferred selection thus chosen. Subsequently, in step S10 the ranking position of the disc identification of the disc to be played is determined. If the disc identification is stored at the top of the ranking indicated by the address pointer 25 step S10 is terminated. However, if this disc identification is not ranked at the top, the position of the disc identification and the associated preferred selections is interchanged with the position of the next higher disc identification and associated preferred selections. This can be achieved simply by interchanging the contents of the rows 20 in which the relevant disc identifications and preferred selections are stored. After step S10 the program is terminated.

In the forgoing the invention has been illustrated for a playback apparatus for Compact Discs. However, the invention may also be applied to playback apparatuses for other types of record carriers, for example record carriers in the form of a tape accommodated in a cassette. Moreover, the invention is not limited to apparatuses for playing back record carriers containing audio information. The invention is equally applicable to record carriers on which other information, for example video information, is recorded.

Finally, it is to be noted that although the apparatus in accordance with the invention is particularly suitable for use in broadcasting studios and discothéques the apparatus is also advantageous for home-entertainment use because also in that case the memory for the storage of the preferred selections will become filled in the long rung, so that a choice will have to be made as to the preferred selections to be removed from the memory.

What is claimed is:

1. Apparatus for playing record carriers, the apparatus comprising a memory, means for loading the memory with record-carrier identifications together with preferred selections denoting specific parts of the record carriers corresponding to the record-carrier identifications, means for detecting, prior to playing of the record-carrier, the record-carrier identification of the record-carrier to be played, means for selecting a preferred selection associated with the detected record-carrier identification when the detected record-carrier identification is stored in the memory, means for controlling the apparatus to play that part of the record carrier as defined by a chosen preferred selection, and means for updating data indicative of the frequency that the record carriers corresponding to the stored record-carrier identifications have been played.

2. Apparatus as claimed in claim 1, the apparatus further comprising means for removing the record-carrier identification and the corresponding preferred selection of one of the least frequently played record carriers depending on the playing-frequency data when the available storage capacity is unable to store a new record-carrier identification and the associated preferred selection.

3. An apparatus as claimed in claim 1, characterized in that the means for updating the playing frequencies are adapted to assign positions in a ranking order to the record-carrier identifications, the ranking position being indicative of the playing frequency of the associated record-carrier, the means for updating the playing frequencies including means for ranking up a record-carrier identification by interchanging the positions of the record-carrier identifications when the associated record-carrier is played and including means for inserting a new record-carrier identification at a predetermined ranking position when a new record-carrier identification is to be stored in the memory.

4. An apparatus as claimed in claim 3, characterized in that the means for ranking up the record-carrier identification are adapted to interchange the positions of two successively ranked record-carrier identifications.

5. An apparatus as claimed in claim 3, characterized in that the predetermined position in which a new record-carrier identification to be stored is inserted in the ranking is the top position.

6. An apparaus as claimed in claim 3, characterized in that the storage means are adapted to store the record-carrier identifications and associated preferred selections in the form of a table, the position occupied by a record-carrier identification in said table indicating its ranking position.

* * * * *